(12) United States Patent
Sloss

(10) Patent No.: US 8,854,920 B2
(45) Date of Patent: Oct. 7, 2014

(54) VOLUME RENDERING OF 3D SONAR DATA

(75) Inventor: Martyn Sloss, Fife (GB)

(73) Assignee: Codaoctopus Group, Jersey City, NJ (US)

( * ) Notice: Subject to any disclaimer, the term of this patent is extended or adjusted under 35 U.S.C. 154(b) by 290 days.

(21) Appl. No.: 13/603,805

(22) Filed: Sep. 5, 2012

(65) Prior Publication Data

US 2014/0064032 A1     Mar. 6, 2014

(51) Int. Cl.
*G01S 15/89*     (2006.01)

(52) U.S. Cl.
USPC .......................................................... 367/88

(58) Field of Classification Search
CPC .... G01S 15/89; G01S 7/6245; G01S 7/52003
USPC .......................................................... 367/88
See application file for complete search history.

(56) References Cited

U.S. PATENT DOCUMENTS

| | | | |
|---|---|---|---|
| 7,898,902 B2* | 3/2011 | Sloss ................................ 367/7 |
| 8,059,486 B2* | 11/2011 | Sloss .............................. 367/88 |
| 2006/0072375 A1* | 4/2006 | Nishimori et al. ............ 367/111 |
| 2007/0159922 A1* | 7/2007 | Zimmerman et al. ........ 367/103 |
| 2009/0310438 A1* | 12/2009 | Sloss ................................ 367/7 |
| 2011/0110194 A1* | 5/2011 | Sloss .............................. 367/88 |
| 2012/0099395 A1* | 4/2012 | Debrunner et al. ............ 367/21 |
| 2012/0099400 A1* | 4/2012 | Debrunner et al. ............ 367/99 |
| 2012/0099402 A1* | 4/2012 | Debrunner et al. .......... 367/134 |
| 2014/0064032 A1* | 3/2014 | Sloss .............................. 367/88 |
| 2014/0064033 A1* | 3/2014 | Sloss ............................ 367/107 |

* cited by examiner

*Primary Examiner* — Daniel Pihulic

(74) *Attorney, Agent, or Firm* — Rodney T Hodgson

(57) ABSTRACT

Sonar imaging data obtained by sending multiple sonar pings towards an object is reduced by assigning values measured by each sonar ping to bins, where each bin is fixed in World Space, and calculating the opacity of each bin to produce an image of the object. A normal vector associated with each bin is used to calculate the light reflected from a model constructed from the data. The most preferred normal vector is calculated from the vector sum of normals calculated from each ping.

16 Claims, 6 Drawing Sheets

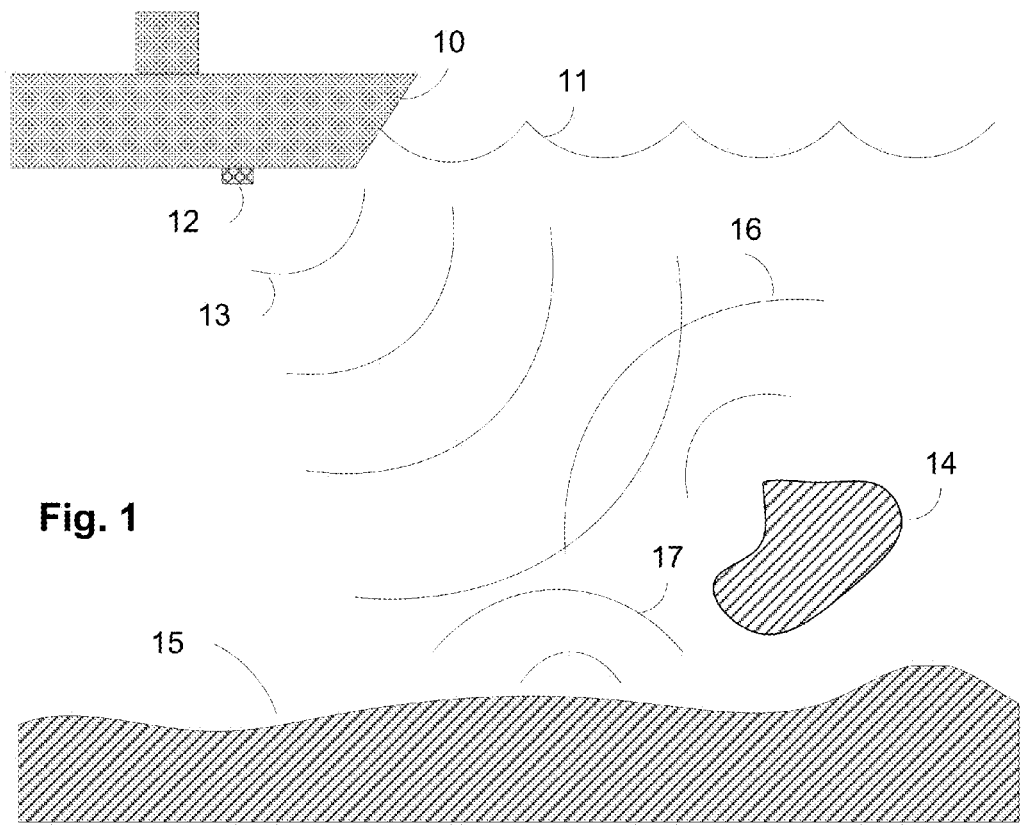
Fig. 1
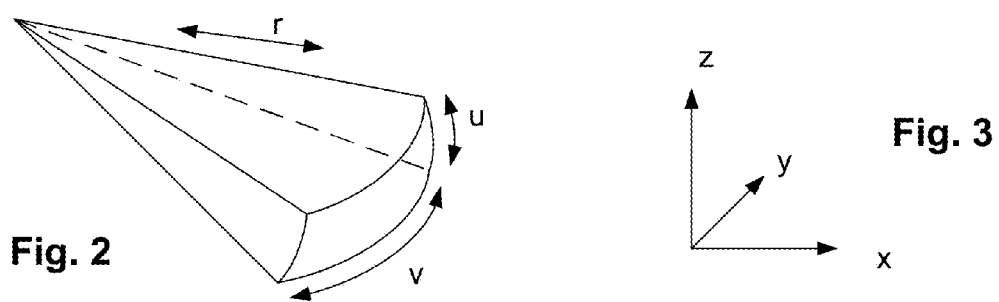
Fig. 2
Fig. 3

Fig. 11
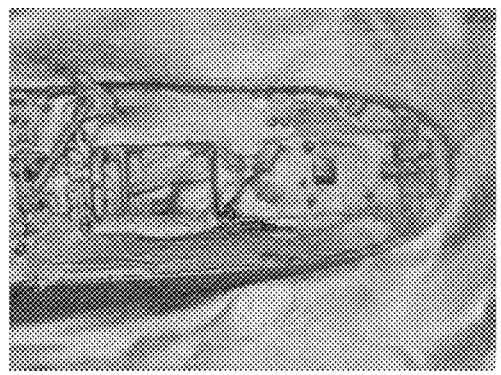
Fig. 12
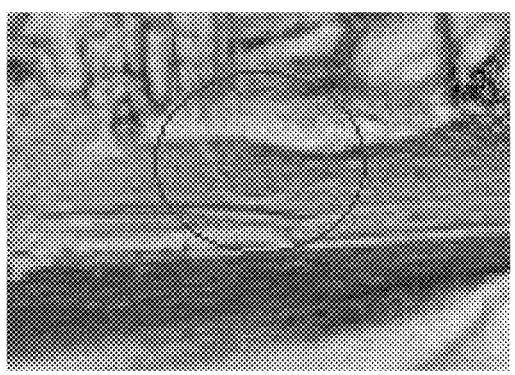
Fig. 13
Fig. 14
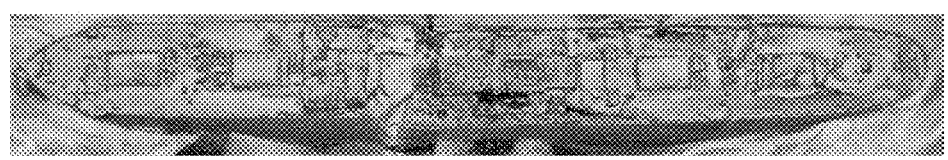

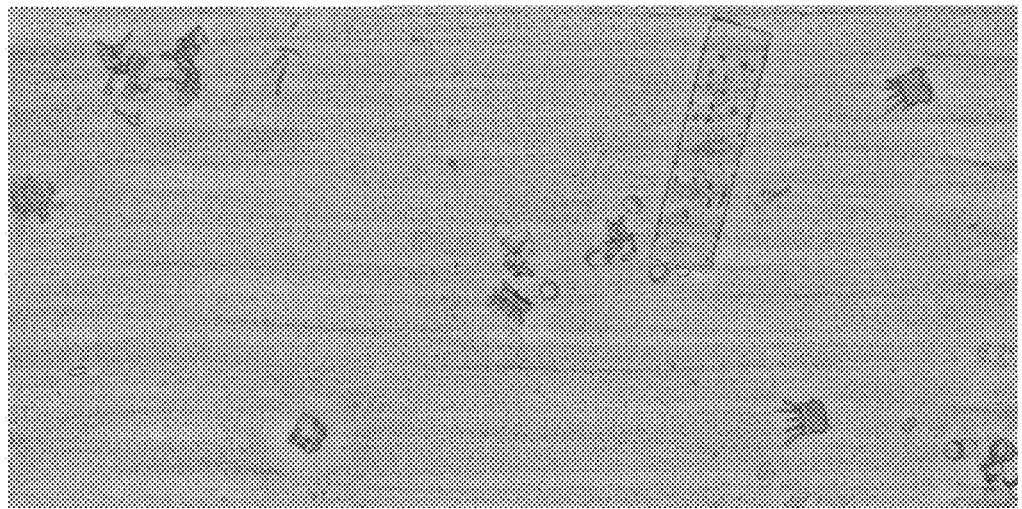
Fig. 15
Fig. 16
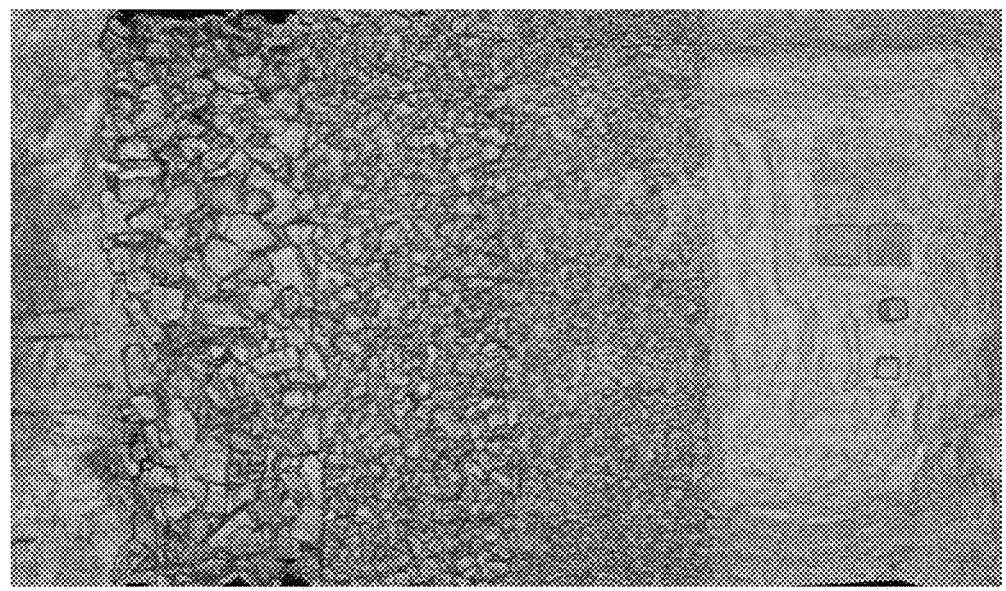

VOLUME RENDERING OF 3D SONAR DATA

RELATED PATENTS AND APPLICATIONS

The following US Patents and US patent applications are related to the present application: U.S. Pat. No. 6,438,071 issued to Hansen, et al. on Aug. 20, 2002, and entitled "Method for producing a 3D image"; U.S. Pat. No. 7,466,628 issued to Hansen on Dec. 16, 2008; U.S. Pat. No. 7,489,592 issued Feb. 10, 2009 to Hansen and entitled "Patch test for 3D sonar data"; U.S. Pat. No. 8,059,486 Sloss on Nov. 15, 2011 and entitled "Method of rendering volume representation of sonar images"; U.S. Pat. No. 7,898,902 issued to Sloss on Mar. 1, 2011 and entitled "Method of representation of sonar images". A U.S. patent application Ser. No. 13/603,723 entitled "Object tracking using sonar imaging", filed on the same day (Sep. 5, 2012) as the present invention by the inventor of the present invention, is also related to the present application The above identified patents and patent applications are assigned to the assignee of the present invention and are incorporated herein by reference in their entirety including incorporated material.

FIELD OF THE INVENTION

The field of the invention is the field of sonar imaging and control.

OBJECTS OF THE INVENTION

It is an object of the invention to produce a method of treating sonar data returned to an array sonar detector to improve image quality.

SUMMARY OF THE INVENTION

Sonar ping data is typically returned as a very sparse and very noisy three dimensional matrix. The method of the invention receives sonar range and intensity data from a two dimensional sonar receiver, and adds intensity and slope data for each ping to bins fixed with respect to three dimensional World Space.

BRIEF DESCRIPTION OF THE DRAWINGS

FIG. 1 shows a sketch of a typical use of the method of the invention.

FIG. 2 shows a sketch of a polar coordinate system.

FIG. 3 shows a sketch of the most preferred Cartesian coordinate system of the invention.

FIG. 11 shows an image constructed from bin opacity and bin normal values.

FIG. 12 shows an image constructed from the most preferred method of the invention using bin opacity and bin normal values calculated by vector sums of ping point normals.

FIG. 13 shows an image constructed by from the most preferred method of the invention.

FIG. 14 shows an image constructed by from the most preferred method of the invention.

FIG. 15 shows an image constructed by from the most preferred method of the invention.

FIG. 16 shows an image constructed by from the most preferred method of the invention.

DETAILED DESCRIPTION OF THE INVENTION

Figure 4:
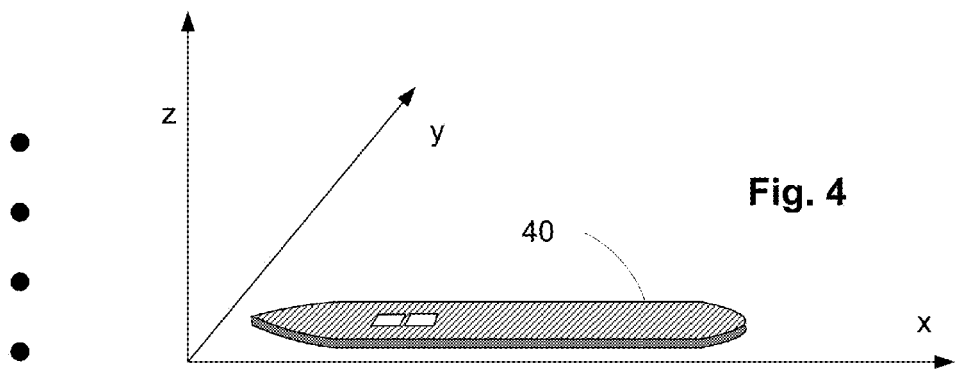
FIG. 4 shows a sketch of a ship on the ocean bottom with Cartesian coordinate system.

It has long been known that data presented in visual form is much better understood by humans than data presented in the form of tables, charts, text, etc. However, even data presented visually as bar graphs, line graphs, maps, or topographic maps requires experience and training to interpret them. Humans can, however, immediately recognize and understand patterns in visual images which would be impossible for even the best and fastest computers to pick out. Much effort has thus been spent in turning data into images.

In particular, images which are generated from data which are not related to light are difficult to produce. One such type of data is sonar data, wherein a sound waves are sent out from a generator into a volume of fluid, and the reflected sound energy from objects in the ensonified volume is recorded by a multielement detector. The term "ensonified volume" is known to one of skill in the art and is defined herein as being a volume of fluid through which sound waves are directed.

FIG. 1 shows a typical sonar imaging system where a vessel 10 floats on the surface 11 of the sea. A sound navigation and ranging (SONAR) receiver 12 is attached to the bottom of the vessel, or alternatively may be strung by a cable from the vessel, or alternatively may be in a remotely operated vehicle (ROV) which sends data to the vessel. The vessel may be a surface vessel as shown, a submarine, or an independently operating ROV.

A single sonar pulse (or "ping") is shown as a wave front 13 propagating from a sonar transmitter attached to the vessel 10. Typically, the pulse would be very short, in the range of 10 to 100 microseconds, and the sound energy would be concentrated in a partial spherical shell of order 10 cm thick in water, around the outgoing line shown as a front 13. The sonar pulse could spread out very broadly over an angular range of, say, 50 degrees by 50 degrees, as shown, or could be concentrated as a directed beam by suitable use of multiple phased sonar transmitters. One characteristic of sonar data is that it is very sparse, as the ensonified volume is generally water or other liquid or gas having only one or a few objects of interest. The volume of the fluid is generally divided into a series of cubes, and data is returned from a small percentage of the cubes. The resolution of the sonar is proportional to the linear dimension of the cubes, while the computation cost of recording the signal from each detector element and calculating from whence the signals have come is inversely proportional to the cube dimensions to the third power. There is then a tradeoff between resolution and computer power and time taken to produce an image from received data.

In other imaging technologies, the data are very dense. In an art unrelated to sonar imaging, medical imaging essentially has signals from each voxel, and the techniques for such imaging as CT scans, MRI scans, PET scans, and Ultrasound Imaging is not applicable to the sparse sonar data. In the same way, signals from sound waves sent out from the earths surface into the depths to return data of rock formations in the search for oil produce dense data, and techniques developed for such fields would not in general be known or used by one of skill in the art of sonar imaging.

The present invention is used to treat the sparse data from sonar imaging equipment to produce images which would be comparable to an optical image of a submerged object, if the object could in fact be seen through turbid water or other fluid.

FIG. 1 shows an object 14 suspended above the seabed 15. Sound waves 16 and 17 are shown schematically reflected from surfaces of the object and the seabed. The reflected sound waves are received at the sonar receiver 12. If the receiver 12 is a two dimensional multielement receiver, the direction from which reflected waves come and the range of the object or the seabed can be calculated. In effect, each element of the multielement receiver measures the pressure versus time of the sound waves impinging on the detector. The phase and intensity of the various beating waves can be measured as the function of position across the multielement array detector much as the phase and intensity of electromagnetic waves can be measured in an light based interferometer. The sound waves reflected to the multielement receiver arrive from the different scattering surfaces at varying times after the sent out pulse. The returning sound waves are measured in consecutive slices of increasing time, so each slice give data on scattering centers at a single range. The resulting pattern gives, in effect, an analog of an optical hologram which describes the three dimensional positions of the objects scattering the known sound waves. The intensities and phases of the sound waves arriving for each slice are analyzed to determine the angular coordinates of the scattering points, and the slice number gives the range of the each scattering point.

The sonar data from such multielement detectors is generally recorded as points in three dimensional space as a function of range r from the detector and of two orthogonal angles (say u and v, for example) with respect to the detector, as shown in FIG. 2. These data in polar coordinate space are in turn generally reduced and presented as data from a three dimensional Cartesian coordinate space defined herein as Worldspace. The data may then be presented as height above the sea bed, for example, or depth below the surface, as a "z" coordinate, while the x and y coordinates could be chosen as west and north, for example. In other examples, the x or y coordinate could be chosen to be parallel to a wall or other long, mostly straight object. This Cartesian coordinate system is shown in FIG. 3. FIG. 4 shows a Cartesian coordinate system with the x axis aligned parallel to a long straight side of an object 40 on the sea bed. Computer analysis can change the polar coordinates since the multielement detector is equipped with measuring instruments (NAV) which measure roll, pitch, and yaw, as well as the x, y, z coordinates of the detector as the ship 10 moves across and through the waves. The intensities are recorded in an image buffer. In the first time slice, for example, the data are recorded in a 128 by 128 array. The intensities of the array are initialized to zero. If there any points returning a signal, the intensity of signal and the range (slice number) is recorded in the buffer. If the intensity of the signal is larger than an FAT threshold, (first to arrive), the range coordinate is recorded in the u, v array. The next slice is then analyzed and signal intensity is recorded. The process continues until the last slice is recorded. If a non zero signal intensity having the same angular coordinates as a previously recorded signal is received, the intensity and range of the earlier signal is overwritten if the signal is larger than the previously received signal (MAX), or ignored if the earlier signal met the FAT criterion.

The process continues until all the signals from the desired range have been received, then the image buffer is transmitted to the analysis computer, and the image buffer on the detector is reinitialized to zero.

The image buffer, or ping buffer, for each ping is analyzed, and can be presented as an image of range (e.g. color) vs angular position. (The inventor anticipates that the data transmission rate will be improved so that intensity vs range data will be retained for improvements in image processing.) To save the bandwidth, the actual image intensities are discarded, either immediately after a FAT signal, or after all slices have been added and the MAX range determined. The image buffer would then be a set of ranges, one range per (u, v) coordinate if a slice intensity reached a criterion, or zero if no intensity met the criterion. In the best case, if there were an object scattering sound at the particular range and u, v coordinate, the range, u, v coordinate would be a "hit", and three dimensional image or map referred to above map could be made. The image from a single ping is usually very noisy, and covers only a small angular field of view. To build up images from many pings to reduce noise, some type of averaging is carried out.

The analysis computer uses the image buffer results from one ping and transfers ping data to bins which cover the volume of the fluid and the object being investigated. The bins are typically associated with cubes fixed in world space. The cubes are preferably the same size, and can have edge dimensions smaller or larger that the distance apart of the points recorded in the buffer. It is convenient to make the bins identical cubes, having touching adjacent sides and edges lengths approximately equal to the range resolution, but the bins may be larger or smaller, and may be any shape and arranged as uniform or non-uniform arrays, as long as the bins have bin points which can be defined as bin centers. FIGS. 5 A-C show a representation of bins from one "layer" of bins, along with ping points associated with the bins. The points are chosen for convenience to be the points at the center of the range slice and in the center of the particular u, v increment.

Figure 5A:
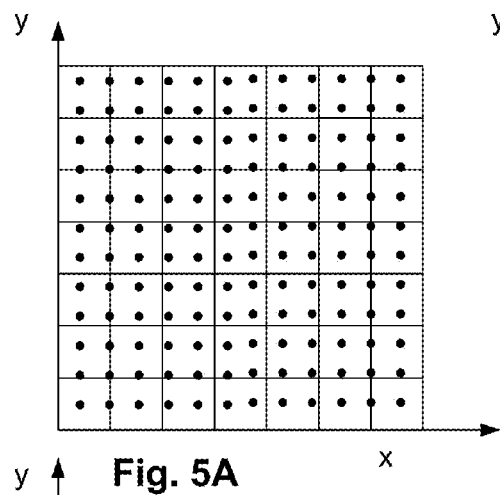
FIGS. 5A-C show sketches of bins having ping points superposed.
Figure 5B:
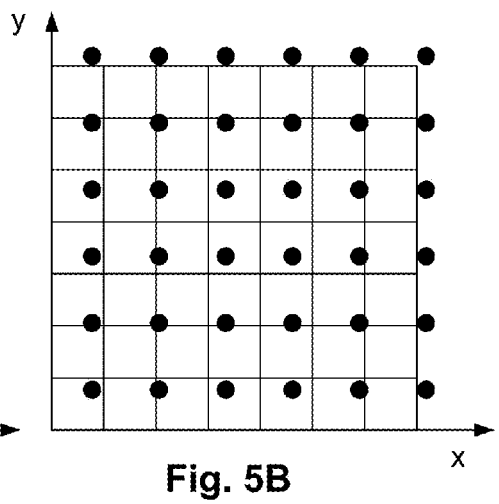
Figure 5C:
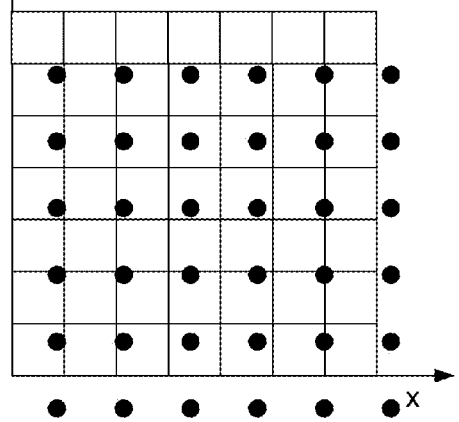

First, the coordinates of each ping point in the image buffer and a slope normal vector calculated from the ping points in the image buffer, are transformed into x, y, z coordinates and a normalized vector in world space, taking into consideration the orientation and position of the detector. Note that FIG. 5C shows the changed relationship of the ping points, which move relative to the bins between each ping, to the ping points sketched in FIG. 5B. The calculation and use of the ping point normals in producing an image from the image buffer are explained in the prior U.S. Pat. No. 8,059,486 issued to the present inventor.

If no signals above the FAT threshold, or above a given signal for MAX representation, are received by any slice, a zero is added to the opacity count of the bin or bins associated with the ping point. Most bins would then be empty after a single ping.

Then, values associated with each ping point from a particular ping are then each associated with a particular bin containing the ping point. If the distance apart of the ping points much less than the bin size, as shown in FIG. 5A, data from the buffer is added only to the bin containing the ping point. It is convenient to record a "hit" recorded at a ping point and by adding an opacity value of "1" to the bin containing the ping point (u,v,r) in this case. Ping point 60 of FIG. 6, which has an associated volume 61, shows such a case. If the distance apart of the ping points is greater than the bin size as shown in FIG. 5B, the opacity number 1 is divided amongst the bin containing the ping point and the surrounding bins according to a criterion, as shown by ping point 62 in FIG. 6, where the associated ping point volume 63 covers a part of 4 bins.

Figure 6:
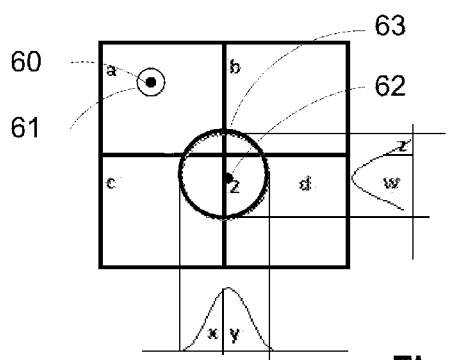
FIG. 6 shows a sketch of two ping points, one contained within a bin and one overlapping bins.

As shown schematically in FIG. 6, the associated volume 63 of ping point 62 has a gaussian spacial distribution function which overlaps part of the 4 bins shown. In each of the spacial dimensions shown, proportions x, y, w, and z, where x+y=1, and w+z=1, are shown. Bin A receives a value x z added to the opacity total, bin B receives y z, bin C received x w, and bin D receives y w. In the case that a ping point volume overlaps bins of two layers instead of the one layer shown in FIG. 6, the ping point opacity value of 1 is divided among the eight bins including and surrounding the ping point. In case that the ping point volume covers a larger number of bins, an analogous process is used to distribute the ping point values among the bins.

A value representing the ping point normal vector is added to the bins in the same way. Either the ping point normal unit vector is added to one bin, or the ping point normal unit vector is divided amongst multiple bins in the same proportion as the opacity values.

Data logged from each ping is added to the bins as the object and detector are moved relative to each other. As pings are added, floating point numbers representing bin opacity and bin normal vectors accumulate in each bin.

Figure 7:
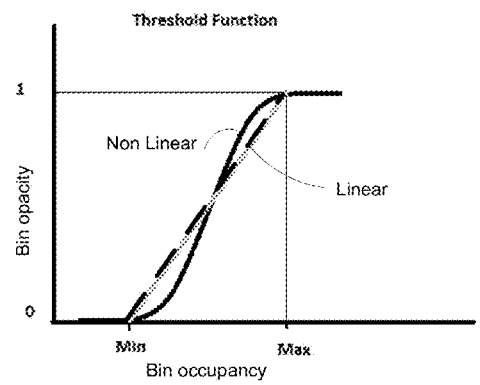
FIG. 7 shows a several possible graphs bin opacity vs bin occupancy.

The process continues until all the data from every ping is entered into the bins. Few counts in a bin are usually just noise, and we can set the bin value and hence the bin opacity to zero. Many counts show that, in fact, there is an acoustically opaque object at that bin position, and the opacity of the bin is set to the maximum value and we no longer need to add opacity data to that bin. Convenient threshold functions to give opacity as a function of bin occupancy are shown in FIG. 7, where the function starts at zero at, say, two counts, and reaches a maximum at 16 counts. A linear or non linear function may be applied.

The opacity for the transmission of light for each bin is calculated from the number of opacity value counts accumulated. If the opacity value is never divided between bins, the bin opacity value would be an integral number between 0 and 16. Functions for the opacity for light transmission of each bin that are convenient are functions which have a maximum at the center of the bin, and go to zero monotonically away from the center of the bin. Functions such as Gaussian functions, cosine functions, and many other functions serve in this capacity. The functions typically cover an area defined by a criterion. One criterion is the sonar resolution at the range r of the ping point. For example, a Gaussian distribution with the half power points at the beam resolution away from the center works well. The distribution is conveniently spherically symmetric about the center of the bin, but may be cylindrically symmetric about the z axis (or vertical axis in the sea) through the center of the bin and symmetric about the x, y plane through the center of the bin. Since the range resolution remains relatively constant independent of the range, and the x, y resolution element gets larger the deeper the bin, a convenient function looks like a squashed spheroid.

Figures 8A, 8B:
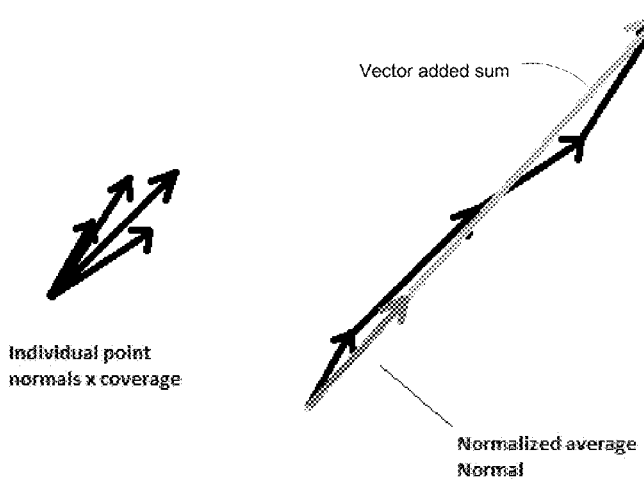
FIG. 8A shows ping point normals assigned to one bin.
FIG. 8B shows the vector sum of ping point normals and a normalized vector sum.

FIG. 8A shows the projection on to a plane of ping point unit vector normals or partial unit vector normals which might be associated with a number of ping points added to a single bin. FIG. 8B shows the plane projection of the vector sum of these ping point normals, and the unit vector resulting from normalizing the vector sum.

The binned data can now be rendered. For each pixel in the output 2D image, following the path of an image ray from the viewpoint, through the volume data and based on the occupancy of the bins it passes through, the opacity of the image pixel can be determined. Using the opacity value, and modeling the surface properties and lighting, a reasonable representation of the data as seen from any viewpoint can be generated. This technique is generally called ray tracing, and there are well known techniques which can speed up the process.

Figure 9:
FIG. 9 shows an image constructed from bin opacity values.

FIG. 9 shows an image where only the binned data opacity is used, and the displayed intensity value is a function of the accumulated opacity value. The problems with using just the binned opacity are:

The shading is fixed to the model, and doesn't change as we vary viewpoint.

Stepped artifacts caused by threshold function and bin size appear.

The bins with low counts are too dark, and high counts are too bright.

If an area was hit by many pings, due to the vessel slowing or turning, or is at the intersection of several tracks it will be much brighter than other areas.

It is very difficult to get a uniformly bright image without washing out bright areas or losing detail on dark areas.

We also get image artifacts along the edges of bins, in the above image of FIG. 9, the parallel lines on the deck are caused by binning; they are not details that actually exist on the object. These artifacts can obscure fine detail that actually exists.

Figure 10:
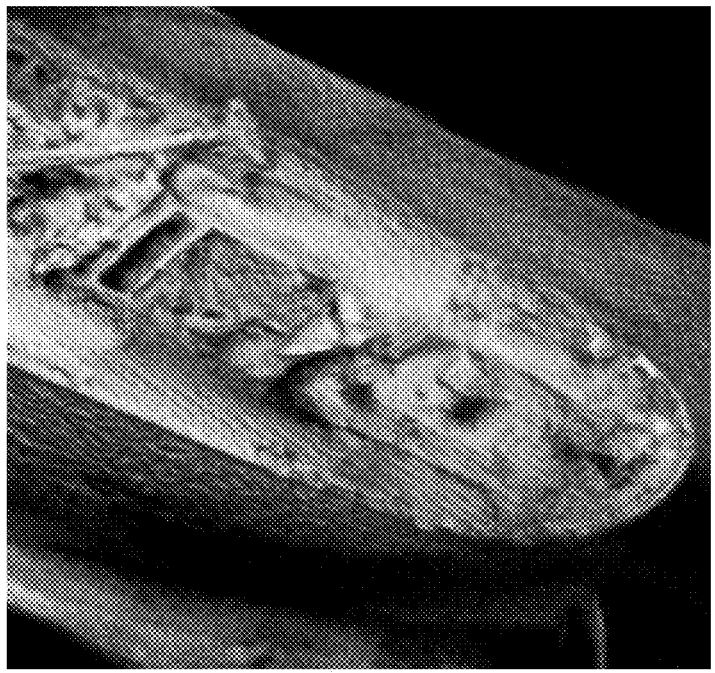
FIG. 10 shows an image constructed from bin opacity and bin normal values.

Shading can be added to the model of FIG. 9. In a previously issued patent, the inventor showed how each ping could be used to calculate a "normal" vector associated with each ping point by taking into account the range values of both a hit and the neighboring "hits" to fit a plane to the three dimensional display of data. Such a technique may be used by using the data in each bin to construct a "bin normal". FIGS. 10 and 11 show the data of FIG. 9 to produce images having different lighting and different viewpoint.

These images show the same problems with intensity as FIG. 9 with the additional problem that bin edges appear blocky. Note the contours on the deck and stepped appearance of the hull.

It is a particular improvement of the present invention to improve sonar images by finding the slope of surfaces of the sonar scattering object.

A single ping may be analyzed to associate a normal to every ping point which returns an intensity and which has at least one neighboring ping point returning an intensity. The difference in range and in u and v dimensions is used to calculate dr/du and dr/dv. A normal vector (magnitude 1) is added as a value to the ping point in the buffer array after or before the ping data is transmitted. The normal data can be analyzed for a single ping to calculate the light scattered from a surface having the normal at the ping point location, and light rays can be drawn which are transmitted, reflected, or scattered from these points. Much better images are produced, however, when the vector normals associated with a ping point are vector added to the bins corresponding to the ping point. The resultant vector sum after all the pings are added is normalized to give a bin normal in x, y, z coordinates for the calculation of the Sonar images. The bin normal calculated from the vector sum of the ping normals gives a much better representation of the data shown from the bin normal calculated only from the bin opacity numbers as in FIGS. 10 and 11.

FIGS. 12-14 show images of the data used in FIGS. 9-11 where the bin normals are taken from the vector added sum of the ping point normals. Note that the contrast ratio is not as extreme, and that as fine detail as the cable (encircled) on the deck in FIG. 13 is resolvable. FIG. 14 gives an image of the entire wreck. The bins for this image are 10 cm dimension cubes, and there are 1338×204×176 bins. Data from 1000 pings are distributed over the bins.

FIG. 15 gives an image of the sea floor in Tampa bay. The rectangular object is a submerged barge and the other objects form an artificial reef.

FIG. 16 is an image taken of a man made flooded pit with differing size rocks, boulders, and blocks.

Obviously, many modifications and variations of the present invention are possible in light of the above teachings. It is therefore to be understood that, within the scope of the appended claims, the invention may be practiced otherwise than as specifically described.

I claim:

1. A method of volumetric rendering of three dimensional sonar data sets of relating to an object immersed in a fluid, comprising:
 a) partitioning a volume of space containing at least part of the object by establishing a set of three dimensional bins occupying the volume of space, wherein the bins are arranged on a large plurality of planes stacked in a z direction, and wherein the bins of each of the large plurality of planes are arrayed with a large plurality of bins in each of x and y directions, where x, y and z are mutually orthogonal spatial coordinates;
 b) directing an $n^{th}$ ping from a source towards the object immersed in the fluid, the ping directed at a time $t_n$, wherein a ping is pulse of sound waves with pulse time $\tau_p$; then
 c) receiving sound waves reflected from the object with a two dimensional sonar receiving array, wherein the sonar receiving array communicates signals measuring the reflected sound waves to a computer readable recording device; then
 d) processing the signals measuring the reflected sound waves to assign values of at least reflected intensity to each ping point of an $n^{th}$ set of ping points arranged in a three dimensional array in the volume of space containing the object, wherein each ping point has an associated resolution depending on the range of the ping point from the detector, and wherein the values are recorded in a computer readable media;
 e) adding a portion of the values assigned to each ping point to one or more bins according to a criterion; then
 f) relatively moving the object and the two dimensional sonar receiving array, and repeating steps a) to e) a plurality of N of times $t_1 \ldots t_N$;
 g) calculating an image for display on an image display device from the binned values recorded in step e).

2. The method of claim 1, wherein the calculation of step g) uses the binned intensity values to determine opacity of a bin.

3. The method of claim 2, wherein the value of intensity assigned to each ping point and the resolution associated with each ping point determine a three dimensional function giving the distribution of opacity for each bin, wherein the distribution of opacity has a maximum value in at each ping point and monotonically falls to an insignificant value at a distance away from the ping point, where the distance is related to the resolution value associated with bin point.

4. The method of claim 1, wherein a value representing a ping point normal vector value is assigned to each ping point in step d), and wherein the calculation of step g) uses the vector added sums of the ping point normal vectors of each bin.

5. The method of claim 4, wherein the calculated image for display includes a light scattering function associated with each bin.

6. The method of claim 1, wherein the image display device is a three dimensional image display device adapted to present 2 different views of the object to two eyes of a human observer.

7. The method of claim 1, wherein the calculated image for display is an image which includes shadowing.

8. The method of claim 1, wherein the calculated image for display includes a light scattering function associated with each bin.

9. A method of volumetric rendering of three dimensional sonar data sets of relating to an object immersed in a fluid, comprising:
 a) partitioning a volume of space containing at least part of the object by establishing a set of three dimensional bins occupying the volume of space, wherein the bins are arranged on a large plurality of planes stacked in a z direction, and wherein the bins of each of the large plurality of planes are arrayed with a large plurality of bins in each of x and y directions, where x, y and z are mutually orthogonal spatial coordinates;
 b) directing an $n^{th}$ ping from a source towards the object immersed in the fluid, the ping directed at a time $t_n$, wherein a ping is pulse of sound waves with pulse time $\tau_p$; then
 c) receiving sound waves reflected from the object with a two dimensional sonar receiving array, wherein the sonar receiving array communicates signals measuring the reflected sound waves to a computer readable recording device; then
 d) processing the signals measuring the reflected sound waves to assign values of at least reflected intensity to each ping point of an $n^{th}$ set of ping points arranged in a three dimensional array in the volume of space containing the object, wherein each ping point has an associated resolution depending on the range of the ping point from the detector, and wherein the values are recorded in a computer readable media;
 e) processing the results of step d) to assign a ping point normal vector to each ping point; then
 f) adding the assigned ping point intensity values assigned to each ping point and vector adding ping point normal vector values assigned to each ping point in steps c) to d) to each bin of the set of three dimensional bins, subject to a criterion;
 g) relatively moving the object and the two dimensional sonar receiving array, and repeating steps a) to f) at plurality of n of times $t_1 \ldots t_n$; then
 h) calculating an image for display on an image display device from the binned values recorded in step f).

10. The method of claim 9, wherein the calculation of step h) uses the binned intensity to determine opacity of a bin.

11. The method of claim 10, wherein the value of intensity assigned to each ping point and the resolution associated with each ping point determine a three dimensional function giving the distribution of opacity for each bin, wherein the distribution of opacity has a maximum value in at each ping point and monotonically falls to an insignificant value at a distance away from the ping point, where the distance is related to the resolution value associated with bin point.

12. The method of claim 11, wherein the three dimensional function giving the distribution of opacity for each ping point is spherically symmetric about the center of each bin.

13. The method of claim 11, wherein the three dimensional function giving the distribution of opacity for each ping point is a function which has squashed spheroidal symmetry about the center of each bin.

14. The method of claim 9, wherein the image display device is a three dimensional image display device adapted to present 2 different views of the object to two eyes of a human observer.

15. The method of claim 9, wherein the calculated image for display is an image which includes shadowing.

16. The method of claim 9, wherein the calculated image for display includes a light scattering function associated with each bin.

* * * * *